United States Patent
Wu et al.

(10) Patent No.: US 10,939,329 B2
(45) Date of Patent: Mar. 2, 2021

(54) DISCARDING DATA CORRESPONDING TO A CONDITIONAL HANDOVER

(71) Applicant: Motorola Mobility LLC, Chicago, IL (US)

(72) Inventors: Lianhai Wu, Beijing (CN); Zhi Yan, Beijing (CN); Chenxi Zhu, Beijing (CN); Haiming Wang, Beijing (CN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/496,702

(22) PCT Filed: Mar. 23, 2017

(86) PCT No.: PCT/CN2017/077846
§ 371 (c)(1),
(2) Date: Sep. 23, 2019

(87) PCT Pub. No.: WO2018/170825
PCT Pub. Date: Sep. 27, 2018

(65) Prior Publication Data
US 2020/0029251 A1    Jan. 23, 2020

(51) Int. Cl.
*H04W 36/38* (2009.01)
*H04W 36/00* (2009.01)
*H04W 36/08* (2009.01)
*H04W 36/36* (2009.01)

(52) U.S. Cl.
CPC ... *H04W 36/0016* (2013.01); *H04W 36/0083* (2013.01); *H04W 36/08* (2013.01); *H04W 36/385* (2013.01)

(58) Field of Classification Search
CPC ......... H04W 36/0016; H04W 36/0083; H04W 36/385; H04W 36/08
USPC ............................................. 455/414
See application file for complete search history.

(56) References Cited

U.S. PATENT DOCUMENTS

| | | | |
|---|---|---|---|
| 2006/0007862 A1* | 1/2006 | Sayeedi | H04L 47/266 370/235 |
| 2007/0097920 A1* | 5/2007 | Chen | H04W 36/0072 370/331 |
| 2008/0089287 A1* | 4/2008 | Sagfors | H04W 72/005 370/331 |
| 2011/0019642 A1 | 1/2011 | Ishii et al. | |

(Continued)

FOREIGN PATENT DOCUMENTS

| | | |
|---|---|---|
| CN | 1878416 A | 12/2006 |
| EP | 2190241 A1 | 5/2010 |

OTHER PUBLICATIONS

PCT/CN2017/077846, Notification of Transmittal of the International Search Report and the Written Opinion of the International Searching Authority, or the Declaration, dated Oct. 23, 2017.

*Primary Examiner* — Inder P Mehra
(74) *Attorney, Agent, or Firm* — Kunzler Bean & Adamson

(57) ABSTRACT

Apparatuses, methods, and systems are disclosed for discarding data corresponding to a conditional handover. One apparatus (300) includes a transmitter (310) that transmits (602) information corresponding to a conditional handover to multiple candidate cells. The information indicates to one or more candidate cells of the multiple candidate cells a time to discard data or to discard the data.

20 Claims, 7 Drawing Sheets

(56) References Cited

U.S. PATENT DOCUMENTS

| | | | |
|---|---|---|---|
| 2013/0170471 A1* | 7/2013 | Nix | H04W 36/00 370/331 |
| 2015/0038148 A1 | 2/2015 | Park et al. | |
| 2015/0078339 A1* | 3/2015 | Ohta | H04W 36/023 370/331 |
| 2015/0181493 A1 | 6/2015 | Park et al. | |
| 2017/0353897 A1* | 12/2017 | Wang | H04W 36/08 |
| 2018/0279188 A1* | 9/2018 | Tenny | H04W 36/0009 |
| 2020/0336957 A1 | 10/2020 | Wu et al. | |

* cited by examiner

_US 10,939,329 B2_

DISCARDING DATA CORRESPONDING TO A CONDITIONAL HANDOVER

FIELD

The subject matter disclosed herein relates generally to wireless communications and more particularly relates to discarding data corresponding to a conditional handover.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a high carrier frequency (e.g., >6 GHz) may be used, such as millimeter wave. In some networks, conditional handovers may be used. In various networks, after a source gNB configures a conditional handover to a UE, the source gNB may forward data to one or more candidate cells involved in the handover command immediately to facilitate avoiding a long latency. The one or more candidate cells may store data from the source gNB in a buffer. Except for one of the candidate cell that is selected as a target cell for handover, other of the one or more candidate cells which the UE will not move to may not know when to discard the data in the buffer. If the data is left in the buffer, the one or more candidate cells may store this data for a long time. In some networks, the one or more candidate cells that receive the handover request may also reserve resources based on the handover request. Accordingly, it may be important to discard the data in the buffer to unreserved the resources.

BRIEF SUMMARY

Apparatuses for discarding data corresponding to a conditional handover are disclosed. Methods and systems also perform the functions of the apparatus. In one embodiment, the apparatus includes a transmitter that transmits information corresponding to a conditional handover to multiple candidate cells. In some embodiments, the information indicates to one or more candidate cells of the multiple candidate cells a time to discard data or to discard the data.

In one embodiment, the information includes a message indicating to the one or more candidate cells to discard the data. In a further embodiment, the transmitter transmits the message to the one or more candidate cells indicating to discard the data in response to a receiver of the apparatus receiving an indication that handover is complete. In certain embodiments, the information includes a timer that upon expiration causes the data to be discarded. In various embodiments, the timer starts in response to the multiple candidate cells receiving the information. In some embodiments, the timer stops in response to a candidate cell of the multiple candidate cells being selected. In one embodiment, the transmitter transmits the data to the one or more candidate cells in response to transmitting the handover command to a remote unit.

A method for discarding data corresponding to a conditional handover, in one embodiment, includes transmitting information corresponding to a conditional handover to multiple candidate cells. In certain embodiments, the information indicates to one or more candidate cells of the multiple candidate cells a time to discard data or to discard the data.

In one embodiment, an apparatus includes a receiver that receives information corresponding to a conditional handover. In some embodiments, the information indicates a time for the apparatus to discard data or to discard the data.

In one embodiment, the information includes a message indicating to discard the data. In a further embodiment, the information includes a timer that upon expiration discards the data. In certain embodiments, the timer starts in response to the apparatus receiving the information. In some embodiments, the timer stops in response to the apparatus being selected as a target cell. In one embodiment, the receiver receives the data.

A method for discarding data corresponding to a conditional handover, in one embodiment, includes receiving information corresponding to a conditional handover. In certain embodiments, the information indicates a time to discard data or to discard the data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
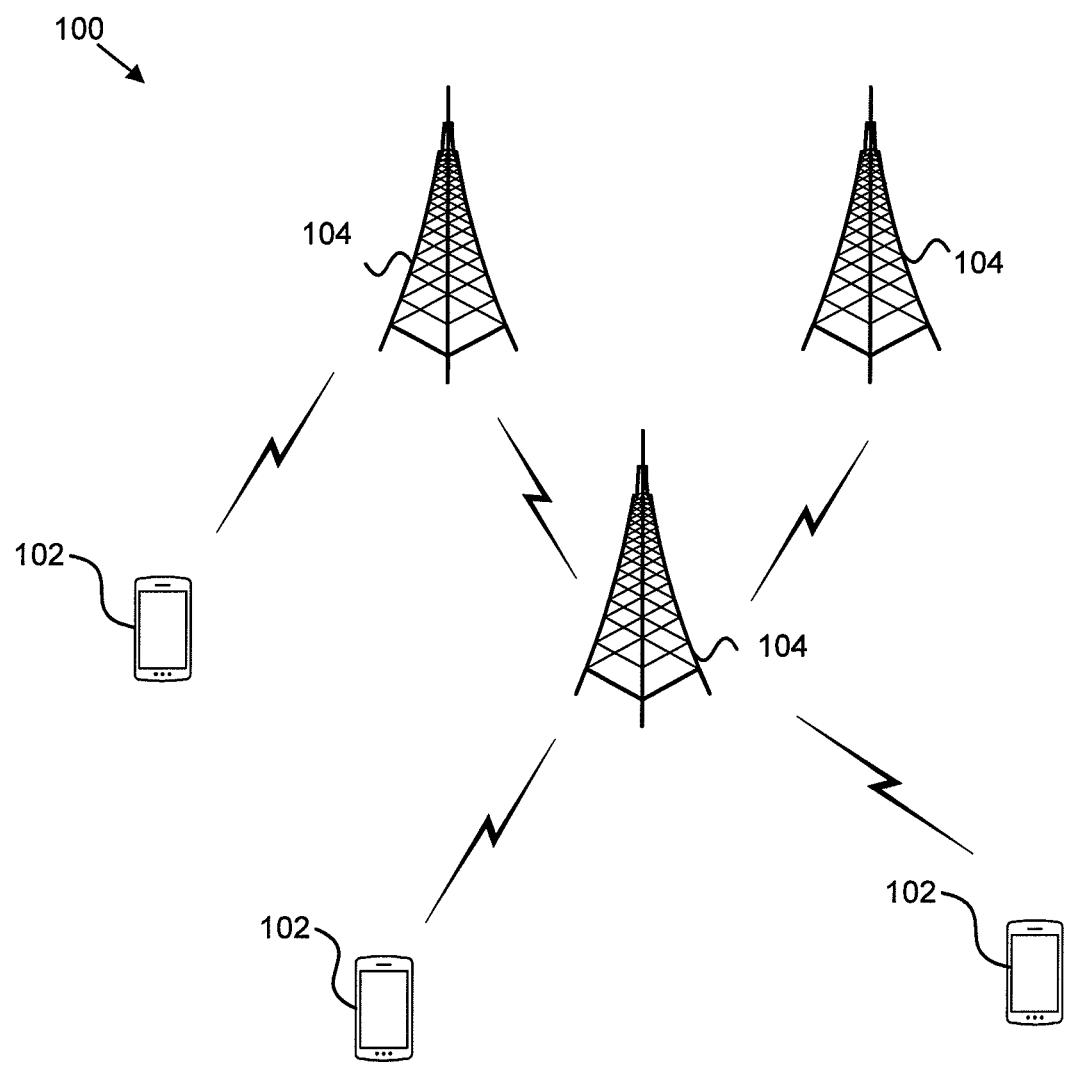
FIG. 1 is a schematic block diagram illustrating one embodiment of a wireless communication system for discarding data corresponding to a conditional handover.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for discarding data corresponding to a conditional handover. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3 GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain. In one embodiment, a remote unit 102 may receive a handover command transmitted from a base unit 104.

In certain embodiments, a base unit 104 may transmit information corresponding to a conditional handover to multiple candidate cells (e.g., multiple other base units 104). In certain embodiments, the information indicates to one or more candidate cells of the multiple candidate cells a time to discard data or to discard the data. Accordingly, a base unit 104 may be used for discarding data corresponding to a conditional handover.

In some embodiments, a base unit 104 may receive information corresponding to a conditional handover transmitted from another base unit 104. In certain embodiments, the information indicates a time to discard data or to discard the data. Accordingly, a base unit 104 may be used for discarding data corresponding to a conditional handover.

Figure 2:
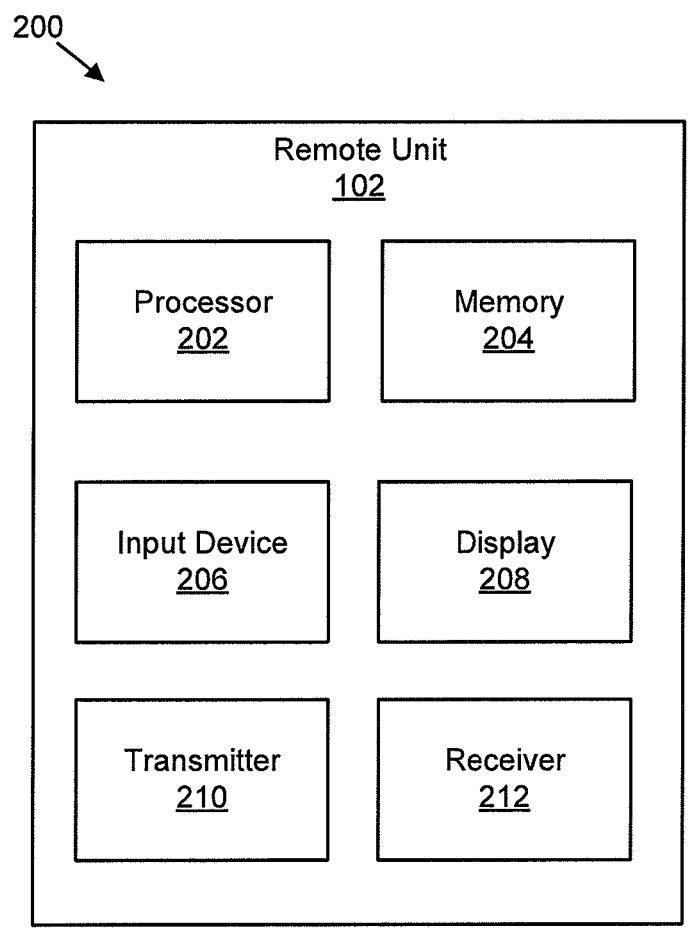
FIG. 2 is a schematic block diagram illustrating one embodiment of an apparatus that may be used for discarding data corresponding to a conditional handover.

FIG. 2 depicts one embodiment of an apparatus 200 that may be used for discarding data corresponding to a conditional handover. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to handovers. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive a handover command involving multiple candidate cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
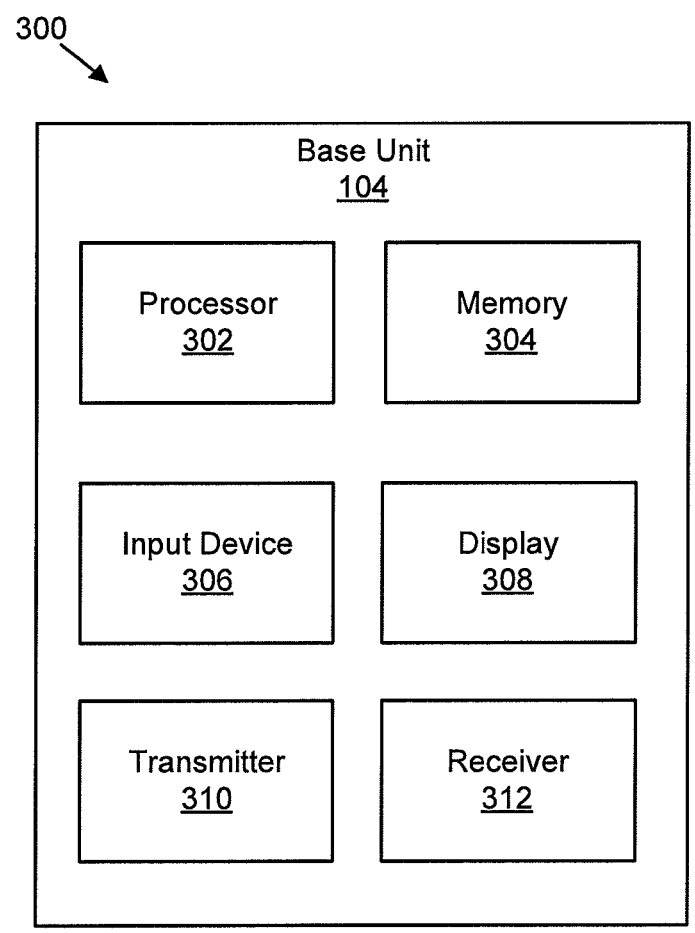
FIG. 3 is a schematic block diagram illustrating one embodiment of an apparatus that may be used for discarding data corresponding to a conditional handover.

FIG. 3 depicts one embodiment of an apparatus 300 that may be used for discarding data corresponding to a conditional handover. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit information corresponding to a conditional handover to multiple candidate cells (e.g., other base units 104). In certain embodiments, the information indicates to one or more candidate cells of the multiple candidate cells a time to discard data or to discard the data. In some embodiments, the receiver 312 is used to receive information corresponding to a conditional handover. In certain embodiments, the information indicates a time to discard data or to discard the data. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
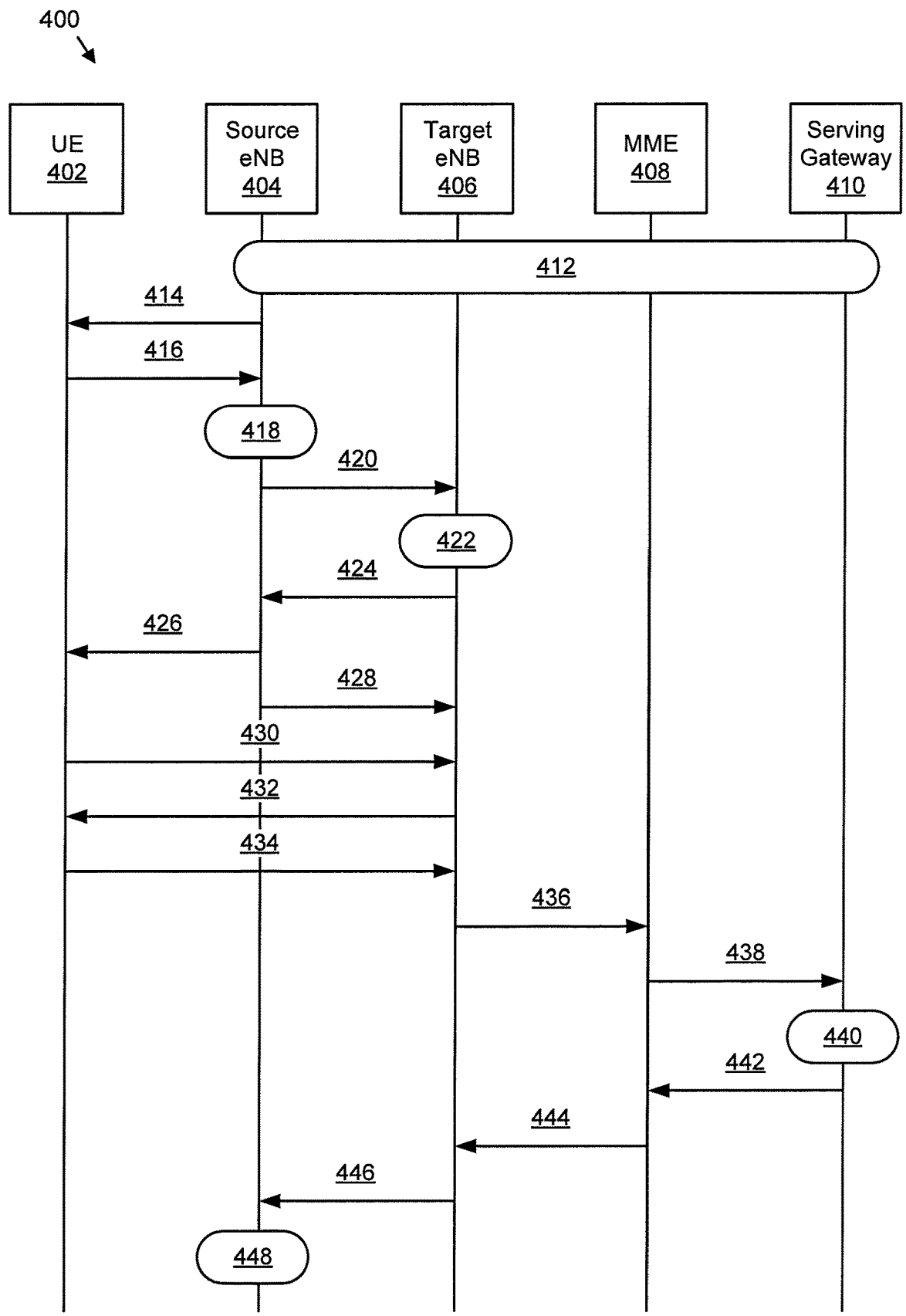
FIG. 4 illustrates one embodiment of communications for handovers.

FIG. 4 illustrates one embodiment of communications 400 for handovers. Specifically, communications 400 between a UE 402, a source eNB 404, a target eNB 406, a mobility management entity ("MME") 408, and a serving gateway 410 are illustrated.

In certain embodiments, a UE context 412 within the source eNB 404 may contain information regarding roaming and access restrictions which were provided either at connection establishment or at a last TA update. In some embodiments, a first communication 414 from the source eNB 404 to the UE 402 includes the source eNB 404 configuring UE measurement procedures according to roaming and access restriction information and available multiple frequency band information. Measurements provided by the source eNB 404 may facilitate the function controlling the UE's connection mobility.

In various embodiments, a second communication 416 from the UE 402 to the source eNB 404 includes a measurement report triggered and sent to the source eNB 404. In certain embodiments, the source eNB 404 determines 418, based on the measurement report and radio resource management ("RRM") information, to hand off the UE 402. In a third communication 420 from the source eNB 404 to the target eNB 406, the source eNB 404 issues a handover request message to the target eNB 406 passing information to prepare the handover at the target side. Admission control 422 may be performed by the target eNB 406 dependent on received QoS information to increase the likelihood of a successful handover, if the resources can be granted by target eNB 406. The target eNB 406 configures the required resources according to the received QoS information and reserves a cell radio network temporary identifier ("C-RNTI") and optionally a RACH preamble. The configuration to be used in the target cell may either be specified independently (e.g., an establishment) or as a delta compared to the configuration used in the source cell (e.g., a reconfiguration).

In a fourth communication 424 from the target eNB 406 to the source eNB 408, the target eNB 406 prepares a handover with L1/L2 and sends a handover request acknowledge to the source eNB 404. The handover request acknowledge message includes a transparent container to be sent to the UE 402 as an RRC message to perform the handover. The container includes a new C-RNTI, target eNB 406 security algorithm identifiers for the selected security algorithms, and may include a dedicated RACH preamble, and possibly other parameters (e.g., access parameters, SIBs, etc.). The handover request acknowledge message may also include radio network layer/transmission network layer ("RNL/TNL") information for the forwarding tunnels, if necessary. In certain embodiments, as soon as the source eNB 404 receives the handover request acknowledge, or as soon as the transmission of the handover command is initiated in the downlink, data forwarding may be initiated.

In a fifth communication 426 from the source eNB 408 to the UE 402, in response to the target eNB 406 generating an RRC message to perform the handover (e.g., RRCConnectionReconfiguration message including the mobilityControlInformation), the source eNB 404 transmits the RRC message to the UE 402. The source eNB 404 performs the necessary integrity protection and ciphering of the message. The UE 402 receives the RRCConnectionReconfiguration message with necessary parameters (e.g., new C-RNTI, target eNB 406 security algorithm identifiers, and optionally dedicated RACH preamble, target eNB 406 SIBs, etc.) and is commanded by the source eNB 404 to perform the handover. The UE 402 does not need to delay the handover execution for delivering the HARQ/ARQ responses to the source eNB 404.

In a sixth communication 428 from the source eNB 404 to the target eNB 406, the source eNB 404 sends a SN status transfer message to the target eNB 406 to convey an uplink packet data convergence protocol ("PDCP") SN receiver status and a downlink PDCP SN transmitter status of enhanced radio access bearers ("E-RABs") for which PDCP status preservation applies. The uplink PDCP SN receiver status includes at least the PDCP SN of a first missing UL service data unit ("SDU") and may include a bit map of the receive status of the out of sequence UL SDUs that the UE 402 needs to retransmit in the target cell, if there are any such SDUs. The downlink PDCP SN transmitter status indicates the next PDCP SN that the target eNB 406 may assign to new SDUs, not having a PDCP SN yet. The source eNB 404 may omit sending this message if none of the E-RABs of the UE 402 are to be treated with PDCP status preservation.

In a seventh communication 430 from the UE 402 to the target eNB 406, after receiving the RRCConnectionReconfiguration message including the mobilityControlInformation, the UE 402 performs synchronization to the target eNB 406 and accesses the target cell via RACH, following a contention-free procedure if a dedicated RACH preamble was indicated in the mobilityControlInformation, or following a contention-based procedure if no dedicated preamble was indicated. The UE 402 derives target eNB 406 specific keys and configures the selected security algorithms to be used in the target cell.

In an eighth communication 432 from the target eNB 406 to the UE 402, the target eNB 406 responds with UL allocation and timing advance. In a ninth communication 434 from the UE 402 to the target eNB 406, the UE 402 has successfully accessed the target cell and the UE 402 sends an RRCConnectionReconfigurationComplete message (e.g., including C-RNTI) to confirm the handover, along with an uplink buffer status report, whenever possible, to the target eNB 406 to indicate that the handover procedure is completed for the UE 402. The target eNB 406 verifies the C-RNTI sent in the RRCConnectionReconfigurationComplete message. The target eNB 406 may then begin sending data to the UE 402.

In a tenth communication 436 from the target eNB 406 to the MME 408, the target eNB 406 sends a path switch request message to the MME 408 to inform the MME 408 that the UE 402 has changed cell. In an eleventh communication 438 from the MME 408 to the serving gateway 410, the MME 408 sends a modify bearer request message to the serving gateway 410. The serving gateway 410 switches 440 the downlink data path to the target side. The serving gateway 410 may send one or more end marker packets on the old path to the source eNB 404 and then may release any U-plane/TNL resources towards the source eNB 404.

In a twelfth communication 442 from the serving gateway 410 to the MME 408, the serving gateway 410 sends a modify bearer response message to the MME 408. In a thirteenth communication 444 from the MME 408 to the target eNB 406, the MME 408 confirms the path switch request message with a path switch request acknowledge message. In a fourteenth communication 446 from the target eNB 406 to the source eNB 404, by sending a UE context release message, the target eNB 406 informs success of the handover to the source eNB 404 and triggers the release of resources by the source eNB 404. The target eNB 406 sends this message after the path switch request acknowledge message is received from the MME 408. Upon reception of the UE context release message, the source eNB 402 may release 448 radio and C-plane related resources associated to the UE 402 context. Any ongoing data forwarding may continue.

In the communication system described in FIG. 4, handover failure may occur due to the following three reasons: an RLF (e.g., too late handover) may occur after the UE 402 has stayed for a long period of time in a cell and the UE 402 may attempt to re-establish a radio link connection in a different cell; an RLF (e.g., too early handover) may occur shortly after a successful handover from a source cell to a target cell or a handover failure occurs during the handover procedure and the UE 402 may attempt to re-establish a radio link connection in a source cell; and an RLF (e.g., handover to a wrong cell) may occurs shortly after a successful handover from a source cell to a target cell or a handover failure may occur during a handover procedure and the UE 402 may attempt to re-establish the radio link connection in a cell other than a source cell and a target cell.

Figure 5:
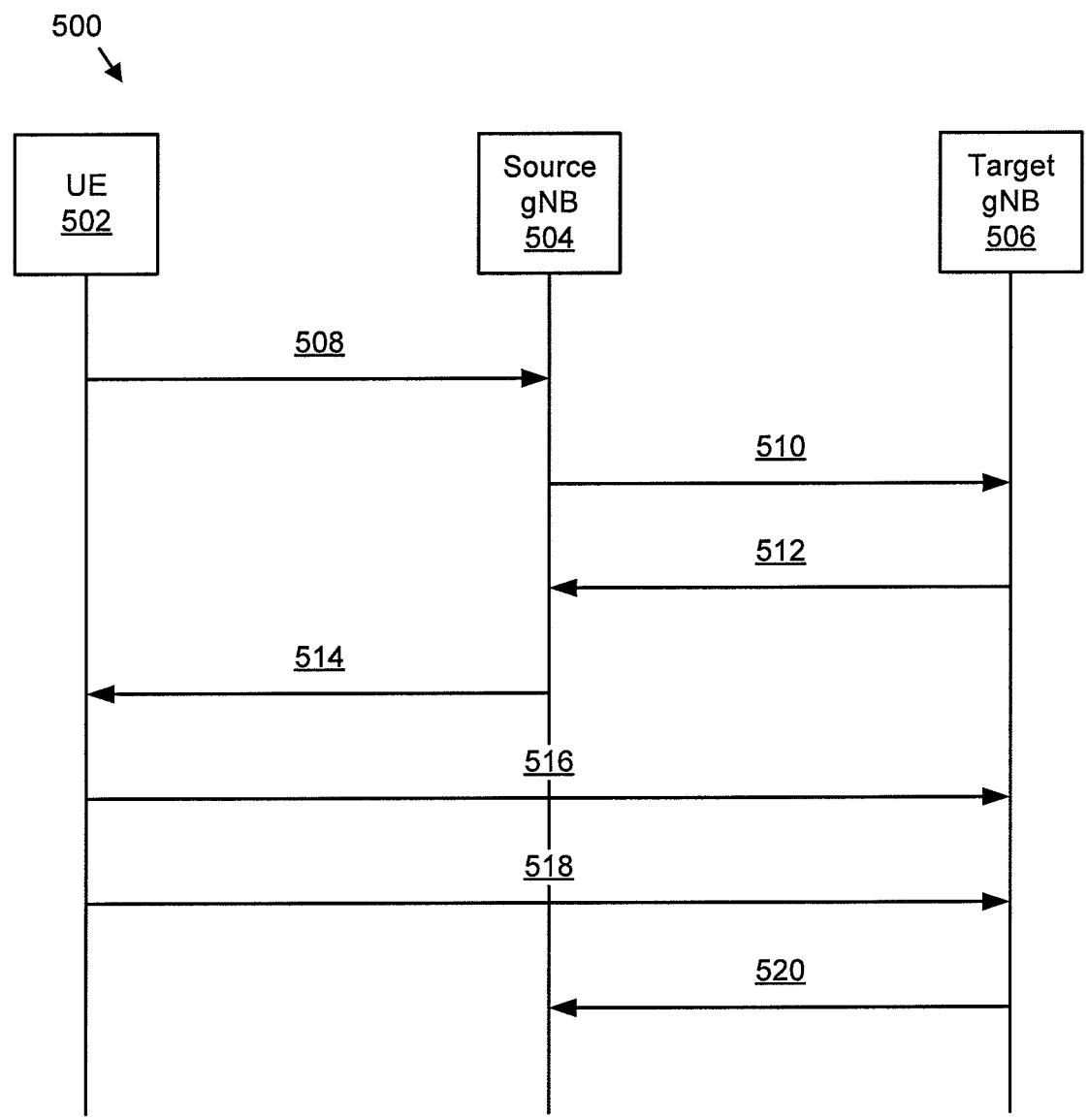
FIG. 5 illustrates one embodiment of communications for conditional handovers.

FIG. 5 illustrates one embodiment of communications 500 for conditional handovers. By using conditional handovers, too late handover, too early handover, and/or handover to a wrong cell may be avoided. Communications 500 between a UE 502, a gNB 504, and a target gNB 506 are illustrated.

A first communication 508 transmitted from the UE 502 to the source gNB 504 may include the UE 502 reporting measurement results (e.g., reference signal received power ("RSRP"), reference signal received quality ("RSRQ")) based on a trigger condition configured by the source gNB 504. A second communication 510 from the source gNB 504 to the target gNB 506 may include, in response to the source gNB 504 making a decision to perform conditional handover based on the measurement result from the UE 502, the source gNB 504 sending a handover request to the target gNB 506. The handover request may be sent to more than one candidate cell (e.g., target gNBs). A third communication 512 from the target gNB 506 to the source gNB 504 may include the source gNB 504 receiving a handover acknowledge from the target gNB 506 (e.g., one or more candidate cells). A fourth communication 514 from the source gNB 504 to the UE 502 may include the source gNB 504 sending a RRCconnectionreconfiguration message including mobilityControlInfo IE and a condition for handover configured by the source gNB 504 to the UE 502. Meanwhile, the source gNB 504 may forward data to the target gNB 506 (e.g., all candidate cells). As used herein, a conditional handover may mean a type of handover in which a UE 502 determines to proceed with a handover in response to the UE 502 determining that a condition has been met. In various embodiments, the condition may be configured by the source gNB 504 and transmitted to the UE 502 as part of the fourth communication 514.

A fifth communication 516 from the UE 502 to the target gNB 506 may include, in response to the condition being met and the UE 502 applying the RRCconnectionreconfiguration, accessing the target gNB 506. A sixth communication 518 from the UE 502 to the target gNB 506 may include the UE 502 informing the target gNB 506 that RRC reconfiguration is complete. A seventh communication 520 from the target gNB 506 to the source gNB 504 may include the target gNB 506 informing the source gNB 504 that handover is completed.

In certain embodiments, to facilitate the target gNB 506 (e.g., one or more candidate cells) knowing a time to discard data from the source gNB 504 in response to not being selected as the target cell, the source gNB 504 may inform the target gNB 506 (e.g., one or more candidate cells not selected as the target cell) to discard data after handover is complete. In one embodiment, the source gNB 504 may send a message to the one or more candidate cells which are not selected as the target cell to discard the data corresponding to the handover after receiving the message that handover is complete from the selected target cell.

In some embodiments, to facilitate the target gNB 506 (e.g., one or more candidate cells) knowing a time to discard data from the source gNB 504 in response to not being selected as the target cell, a timer may be included in the handover request message. If the timer expires (e.g., elapses, ends, etc.) and handover does not happen for one or more candidate cells receiving the timer, the one or more candidate cells that are not selected as a target cell discard the received data from the source gNB 504 that corresponds to the handover.

Figure 6:
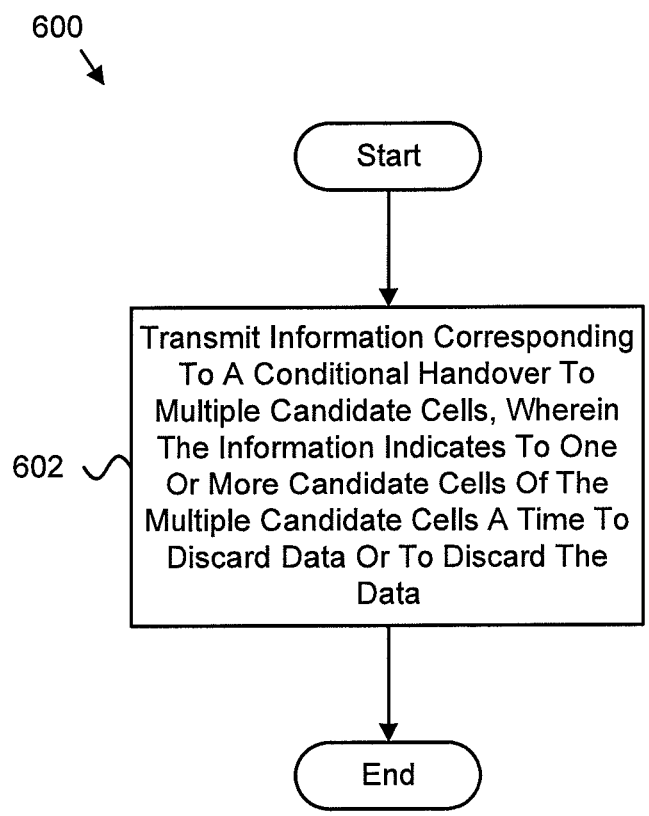
FIG. 6 is a schematic flow chart diagram illustrating one embodiment of a method for discarding data corresponding to a conditional handover.

FIG. 6 is a schematic flow chart diagram illustrating one embodiment of a method 600 for discarding data corresponding to a conditional handover. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 information corresponding to a conditional handover to multiple candidate cells. In certain embodiments, the information indicates to one or more candidate cells of the multiple candidate cells a time to discard data or to discard the data.

In one embodiment, the information includes a message indicating to the one or more candidate cells to discard the data. In a further embodiment, the method 600 includes transmitting the message to the one or more candidate cells indicating to discard the data in response to receiving an indication that handover is complete. In certain embodiments, the information includes a timer that upon expiration causes the data to be discarded. In various embodiments, the timer starts in response to the multiple candidate cells receiving the information. In some embodiments, the timer stops in response to a candidate cell of the multiple candidate cells being selected. In one embodiment, the method 600 includes transmitting the data to the one or more candidate cells in response to transmitting the handover command to a remote unit.

Figure 7:
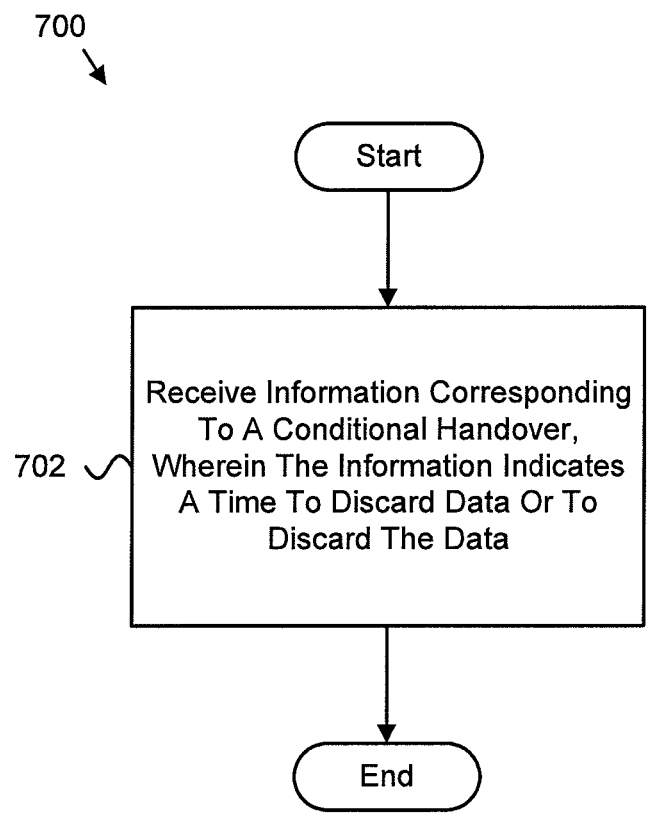
FIG. 7 is a schematic flow chart diagram illustrating another embodiment of a method for discarding data corresponding to a conditional handover.

FIG. 7 is a schematic flow chart diagram illustrating another embodiment of a method 700 for discarding data corresponding to a conditional handover. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include receiving 702 information corresponding to a conditional handover. In certain embodiments, the information indicates a time to discard data or to discard the data.

In one embodiment, the information includes a message indicating to discard the data. In a further embodiment, the information includes a timer that upon expiration discards the data. In certain embodiments, the timer starts in response receiving the information. In some embodiments, the timer stops in response being selected as a target cell. In one embodiment, the method 700 includes receiving the data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a base unit, wherein the apparatus comprises:
   a transmitter that transmits, from the base unit, information corresponding to a conditional handover to a plurality of candidate target cells, wherein the conditional handover is a handover performed in response to determining that a configured condition has been met, and the information transmitted by the transmitter:
   comprises an indication to one or more candidate target cells of the plurality of candidate target cells; and
   the indication indicates:
      a time to conditionally discard data; or
      to discard the data in response to receiving the information, wherein:
         in response to a receiving device being selected as a target cell out of the plurality of candidate target cells for the conditional handover, the receiving device keeps the data; and
         in response to the receiving device not being selected as the target cell for the conditional handover, the target cell discards the data based on the time to conditionally discard the data or discards the data in response to receiving the information.

2. The apparatus of claim 1, wherein the information comprises a message indicating to the one or more candidate target cells to discard the data in response to receiving the information.

3. The apparatus of claim 2, wherein the transmitter transmits the message to the one or more candidate target cells indicating to discard the data in response to a receiver of the apparatus receiving an indication that the conditional handover is complete.

4. The apparatus of claim 1, wherein the information comprises a timer that upon expiration causes the data to be conditionally discarded.

5. The apparatus of claim 4, wherein the timer starts in response to the plurality of candidate cells receiving the information.

6. The apparatus of claim 4, wherein the timer stops in response to a candidate target cell of the plurality of candidate target cells being selected as the target cell.

7. The apparatus of claim 1, wherein the transmitter transmits the data to the one or more candidate target cells in response to transmitting a conditional handover command to a remote unit.

8. A method comprising:
   transmitting information corresponding to a conditional handover to a plurality of candidate target cells, wherein the conditional handover is a handover performed in response to determining that a configured condition has been met, and the information:
   comprises an indication to one or more candidate target cells of the plurality of candidate target cells; and
   the indication indicates:
      a time to conditionally discard data; or
      to discard the data in response to receiving the information, wherein:
         in response to a receiving device being selected as a target cell out of the plurality of candidate target cells for the conditional handover, the receiving device keeps the data; and
         in response to the receiving device not being selected as the target cell for the conditional handover, the target cell discards the data based on the time to conditionally discard the data or discards the data in response to receiving the information.

9. The method of claim 8, wherein the information comprises a message indicating to the one or more candidate target cells to discard the data in response to receiving the information.

10. The method of claim 9, further comprising transmitting the message to the one or more candidate target cells indicating to discard the data in response to receiving an indication that the conditional handover is complete.

11. The method of claim 8, wherein the information comprises a timer that upon expiration causes the data to be conditionally discarded.

12. The method of claim 11, wherein the timer starts in response to the plurality of candidate target cells receiving the information.

13. The method of claim 11, wherein the timer stops in response to a candidate target cell of the plurality of candidate target cells being selected as the target cell.

14. An apparatus comprising a candidate target cell of a plurality of candidate target cells, wherein the apparatus comprises:
   a receiver that receives information from a base unit corresponding to a conditional handover, wherein the conditional handover is a handover performed in response to determining that a configured condition has been met, and the information is transmitted to the plurality of candidate target cells and the information indicates:
   a time for the apparatus to conditionally discard data; or
   to discard the data in response to receiving the information;
   wherein:
      in response to being selected as a target cell out of the plurality of candidate target cells for the conditional handover, the apparatus keeps the data; and
      in response to not being selected as the target cell for the conditional handover, the apparatus discards the data based on the time to conditionally discard the data or discards the data in response to receiving the information.

15. The apparatus of claim 14, wherein the receiver receives the data.

16. A method comprising:
   receiving information from a base unit corresponding to a conditional handover, wherein the conditional handover is a handover performed in response to determining that a configured condition has been met, and the information is transmitted to a plurality of candidate target cells and the information indicates:
   a time to conditionally discard data; or
   to discard the data in response to receiving the information;
   in response to being selected as a target cell out of the plurality of candidate target cells for the conditional handover, keeping the data; and
   in response to not being selected as the target cell for the conditional handover, discarding the data based on the time to conditionally discard the data or discarding the data in response to receiving the information.

17. The method of claim 16, wherein the information comprises a message indicating to discard the data in response to receiving the information.

18. The method of claim 16, the information comprises a timer that upon expiration conditionally discards the data.

19. The method of claim 18, wherein the timer starts in response to receiving the information.

20. The method of claim 18, wherein the timer stops in response to being selected as the target cell.

* * * * *